(12) United States Patent
Borisavljevic

(10) Patent No.: US 7,339,344 B2
(45) Date of Patent: Mar. 4, 2008

(54) SELF TUNING METHOD AND APPARATUS FOR PERMANENT MAGNET SENSORLESS CONTROL

(75) Inventor: Ana Borisavljevic, Marina Del Rey, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/459,230

(22) Filed: Jul. 21, 2006

(65) Prior Publication Data

US 2007/0046246 A1  Mar. 1, 2007

Related U.S. Application Data

(60) Provisional application No. 60/711,109, filed on Aug. 25, 2005.

(51) Int. Cl.
*H02P 6/00* (2006.01)

(52) U.S. Cl. ............. 318/723; 318/719; 318/721; 318/808

(58) Field of Classification Search ............. 318/719, 318/721, 723, 808
See application file for complete search history.

(56) References Cited

U.S. PATENT DOCUMENTS

| | | | |
|---|---|---|---|
| 6,630,809 B2 * | 10/2003 | Chen et al. | 318/804 |
| 6,768,284 B2 * | 7/2004 | Lee et al. | 318/808 |
| 6,809,496 B2 * | 10/2004 | Anghel et al. | 318/700 |
| 6,910,389 B2 * | 6/2005 | Ho | 73/862.193 |
| 7,075,264 B2 * | 7/2006 | Huggett et al. | 318/722 |
| 7,141,952 B2 * | 11/2006 | Blodow | 318/716 |
| 2004/0052217 A1 * | 3/2004 | Anghel et al. | 370/254 |
| 2004/0062062 A1 * | 4/2004 | Lee et al. | 363/37 |
| 2006/0043923 A1 * | 3/2006 | Baker et al. | 318/807 |
| 2006/0108968 A1 * | 5/2006 | Blodow | 318/719 |
| 2006/0279248 A1 * | 12/2006 | Borisavljevic | 318/723 |

OTHER PUBLICATIONS

Bimal Bose, "Power Electronics and Variable Frequency Drives," IEEE Computer Society Press, Oct. 1996.
Joachim Holtz, et al., "Identification and Compensation of Torque Ripple in High-Precision Permanent Magnet Motor Drives," IEEE Transactions on Industrial Electronics, vol. 43, No. 2, pp. 309-320, 1996.
Mathworks: SimPower Systems library for Simulink, no date.

* cited by examiner

*Primary Examiner*—Paul Ip
(74) *Attorney, Agent, or Firm*—Ostrolenk, Faber, Gerb & Soffen, LLP

(57) ABSTRACT

A plurality of parameters of a Permanent Magnet Synchronous Motor (PMSM) is determined by a motor controller for differentiating between a plurality of PMSMs. This is achieved by first applying regulated DC motor currents at a commanded fixed rotor angle and measuring a quadrature voltage; parking the PMSM at standstill, Then, after selecting an initial set of controller parameters; applying the quadrature voltage equal to zero and measuring a time constant. Then, accelerating the PMSM with a constant torque up to a preset target speed and measuring a total acceleration time $t_{accelerate}$ until the preset target speed $\omega_{target}$ is reached. After regulating a stator current at 0 value, measuring the quadrature voltage and a freewheeling motor speed $\omega_{freewheel}$ immediately after applying the 0 stator current; and calculating an electrical constant $K_E$ of the PMSM; a load inertia J; and a set of parameters for the controller.

17 Claims, 2 Drawing Sheets

SELF TUNING METHOD AND APPARATUS FOR PERMANENT MAGNET SENSORLESS CONTROL

CROSS-REFERENCE TO RELATED APPLICATION

This application is based on and claims the benefit of U.S. Provisional Application Ser. No. 60/711,109, filed on Aug. 25, 2005, entitled SELF TIMING ALGORITHM FOR PERMANENT MAGNET SENSORLESS CONTROL, to which a claim of priority is hereby made and the disclosure of which is incorporated by reference.

BACKGROUND OF THE INVENTION

The present invention relates to Permanent Magnet Synchronous Motor (PMSM) controllers and more particularly to measurement of motor parameters by a motor controller and adaptation of the controller to the sensed motor parameters.

Motor drives are presently used in a vast range of applications such as fans, pumps, compressors, washing machines, and etc. In such applications motor drives are required to have high efficiency, low noise and robust, stable operation.

It would be very useful to have a circuit that can work with different motors and be able to adapt to parameters of the presently connected motor.

SUMMARY OF THE INVENTION

It is an object of the present invention to provide a procedure for estimating drive motor parameters by using the motor controller and automatically adjust compensation parameters of the controller to ensure stable operation of a motor drive.

The present invention provides a controller circuit for performing a three-point Pulse Width Modulation (PWM) of a Permanent Magnet Synchronous Motor (PMSM) and for measuring PMSM parameters to differentiate between a plurality of PMSMs. The circuit includes an outer speed loop for setting the desired speed of the PMSM; a first inner current loop for regulating a quadrature component $i_q$ of the motor current; a second inner current loop regulates a direct component $i_d$ of the motor current, the motor current $i_d$ is the equivalent motor stator current projected onto a d-axis aligned with a rotor field, and the motor current $i_q$ is the equivalent motor stator current projected on a q-axis, which is perpendicular to the rotor field; and a speed observer circuit having an input of voltages $v_\alpha$ and $v_\beta$ and currents $i_\alpha$ and $i_\beta$ and outputting an angular position of a rotor $\theta_r$ and an observed rotor speed $\omega_{obs}$. Each of the loops includes a Proportional-Integral (PI) compensator, each compensator having a proportional gain and an integral gain and lower and upper limits imposed on the integral part of the compensator to prevent wind-up during transient currents.

To achieve objectives of the present invention, the controller circuit performs a method of determining a plurality of parameters of a Permanent Magnet Synchronous Motor (PMSM) by a motor controller to differentiate between a plurality of PMSMs. In its first stage the method applies regulated DC motor currents at a commanded fixed rotor angle, parks the PMSM at standstill, when PMSM is parked the quadrature voltage applied across the PMSM windings is proportional to a stator resistance and to an applied park current, and selects an initial set of current controllers' parameters.

In its second stage it applies the quadrature voltage equal to zero, accelerates the PMSM with a constant torque up to the present target speed in accordance with a time constant corresponding to an exponential decay of a quadrature current, and regulates a stator current at 0 value using a total acceleration time to the present target speed. The stator current is at 0 value when regulated DC motor currents are at zero value.

Finally, the method performs a third stage by calculating an electrical constant of the PMSM based on the values of the applied quadrature voltage and a free motor speed immediately after applying the 0 stator current, a load inertia based on the previously measured total acceleration time if there is no external shaft torque and the contribution of the friction torque is negligible during the acceleration step, and a correct set of parameters to provide the optimum performance for the quadrature voltage and free motor speed.

Other features and advantages of the present invention will become apparent from the following description of the invention that refers to the accompanying drawings.

DETAILED DESCRIPTION OF EMBODIMENTS OF THE INVENTION

Figure 1:
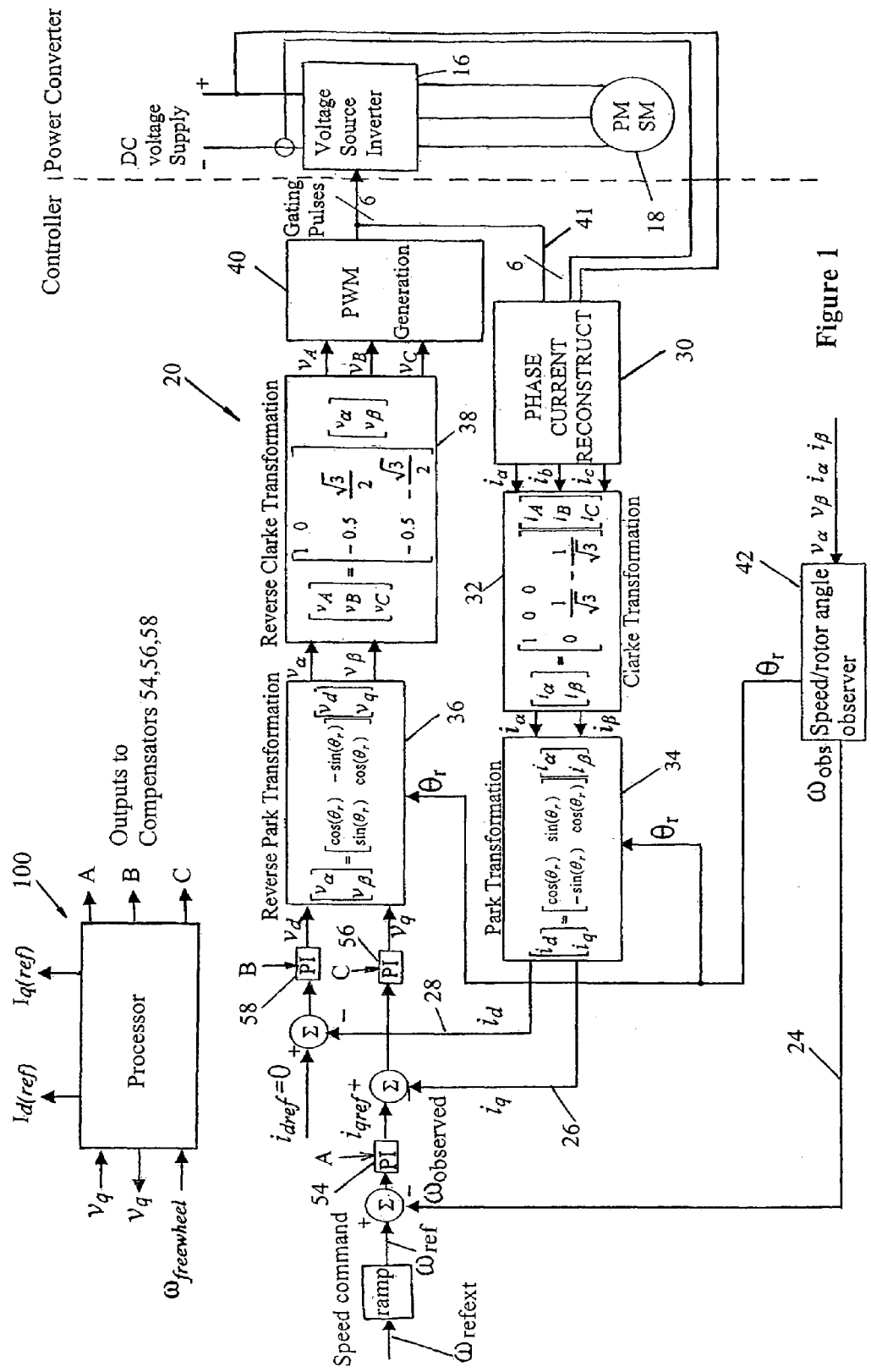
FIG. 1 is a block diagram of a PMSM controller.

A block diagram of a typical non-salient Permanent Magnet Synchronous Motor (PMSM) controller 20 employed in the above-mentioned applications, is shown in FIG. 1. The illustrated controller is based on the Field Oriented Control (FOC) principle described in "Power Electronics and Variable Frequency Drives", *IEEE Computer Society Press*, October 1996, by Bimal Bose ("Bose"). The controller 20 includes an outer speed loop and two inner current loops. The speed of a PMSM 18 is regulated to be equal to a command value provided by the action of an outer speed loop 24. One inner current loop 26 regulates a quadrature component of a motor current $i_q$ and another inner current loop 28 regulates a direct component of a motor current $i_d$. The quadrature axis is perpendicular to the rotor flux vector. The motor current $i_d$ is the equivalent of the motor stator current projected onto the d-axis, which is aligned with a rotor field, and the motor current $i_q$ is the equivalent of a motor stator current projected on the q-axis, which is perpendicular to the rotor field (see Bose).

A model of the PMSM motor in d-q coordinates is given by the following Equations (1) to (5) as described in "Mathworks: SimPowerSystems Library" for Simulink, which may be found on the Internet at mathworks.com:

$$\frac{d}{dt}i_d = \frac{1}{L_d}v_d - \frac{R}{L_d}i_d + \frac{L_q}{L_d}p\omega_r i_q \qquad (1)$$

$$\frac{d}{dt}i_q = \frac{1}{L_q}v_q - \frac{R}{L_q}i_q - \frac{L_d}{L_q}p\omega_r i_d - \frac{\lambda p\omega_r}{L_q} \qquad (2)$$

$$T_e = 1.5p[\lambda i_q + (L_d - L_q)i_d i_q] \qquad (3)$$

$$\frac{d}{dt}\omega_r = \frac{1}{J}(T_e - F\omega_r - T_m) \qquad (4)$$

-continued $$\frac{d\theta_r}{dt} = \omega_r \quad (5)$$

In Equations (1) to (5) variables and parameters are defined as follows:
$L_q$, $L_d$ q and d axis inductances;
R Resistance of the stator windings;
$i_q$, $i_d$ q and d axis currents;
$v_q$, $v_d$ q and d axis voltages;
$\omega_r$ Angular velocity of the rotor;
$\lambda$ Amplitude of the flux induced by the permanent magnets of the rotor in the stator phases;
p Number of pole pairs;
$T_e$ Electromagnetic torque;
J Combined inertia of rotor and load;
F Combined viscous friction of rotor and load;
$\theta_r$ Rotor angular position; and
$T_m$ Shaft mechanical torque.

The inner current loops 26 and 28 determine quadrature component of the motor current $i_q$ and the direct component of the motor current $i_d$. To this end a phase current reconstruction section 30 receives the six gate pulse signals 41 and provides current values $i_a$, $i_b$, and $i_c$ to section 32. Section 32 performs a Clarke transformation $$\begin{bmatrix} i_\alpha \\ i_\beta \end{bmatrix} = \begin{bmatrix} 1 & 0 & 0 \\ 0 & \frac{1}{\sqrt{3}} & -\frac{1}{\sqrt{3}} \end{bmatrix} \begin{bmatrix} i_A \\ i_B \\ i_C \end{bmatrix}$$

on the received current values, outputting transformation currents $i_\alpha$ and $i_\beta$ to section 34, where a Park transformation $$\begin{bmatrix} i_d \\ i_q \end{bmatrix} = \begin{bmatrix} \cos(\theta_r) & \sin(\theta_r) \\ -\sin(\theta_r) & \cos(\theta_r) \end{bmatrix} \begin{bmatrix} i_\alpha \\ i_\beta \end{bmatrix}$$

is performed producing the motor current $i_q$ and $i_d$ values. These motor current values are summed with reference values $i_{q(ref)}$ and $i_{d(ref)}$ respectively and then transformed into voltages $v_q$ and $v_d$ by PI compensates 56, 58 and supplied to section 36 to be reverse Park transformed as follows:

$$\begin{bmatrix} v_\alpha \\ v_\beta \end{bmatrix} = \begin{bmatrix} \cos(\theta_r) & -\sin(\theta_r) \\ \sin(\theta_r) & \cos(\theta_r) \end{bmatrix} \begin{bmatrix} v_d \\ v_q \end{bmatrix}$$

This transformation provides transformation voltage values $v_\alpha$ and $v_\beta$ to section 38, where the reverse Clarke transformation $$\begin{bmatrix} v_A \\ v_B \\ v_C \end{bmatrix} = \begin{bmatrix} 1 & 0 \\ -0.5 & \frac{\sqrt{3}}{2} \\ -0.5 & -\frac{\sqrt{3}}{2} \end{bmatrix} \begin{bmatrix} v_\alpha \\ v_\beta \end{bmatrix}$$

provides voltages $v_A$, $v_B$, and $v_C$ to the PWM generation section 40 that is used for generating gating pulses sent to a Voltage Source Inverter 16 for driving the PMSM 18.

A speed/rotor angle observer section 42 of the outer speed loop 24 obtains the transformation currents $i_\alpha$ and $i_\beta$ from section 32 and the transformation voltages $v_\alpha$ and $v_\beta$ from section 36 and outputs an observed rotor speed $\omega_{obs}$ as a reference in the setting of the speed and an angular position of the rotor $\theta_r$ to the Park and reverse Park transformation sections 34 and 36. One example of the speed observer section 42 is described in U.S. Pat. No. 6,910,389.

The controller 20 further includes three Proportional-Integral (PI) compensators, PI 54 in outer loop 24, PI 56 in inner loop 26, and PI 58 in inner loop 28. Each compensator has a proportional gain and an integral gain. Each PI compensator also has a lower and upper limit imposed on the integral part of the compensator to prevent wind-up during transient currents.

These gain and limit parameters are tuned in such a way as to provide robustly stable operation for one set of expected motor parameters and operating conditions. If the gain and limit parameters are selected based on one set of motor parameters, the same parameters can produce an unstable drive operation if utilized to run another motor.

The present invention provides a method and apparatus to estimate the drive motor parameters by using the motor controller and automatically adjust the compensator parameter to ensure stable operation of the drive.

Figure 2:
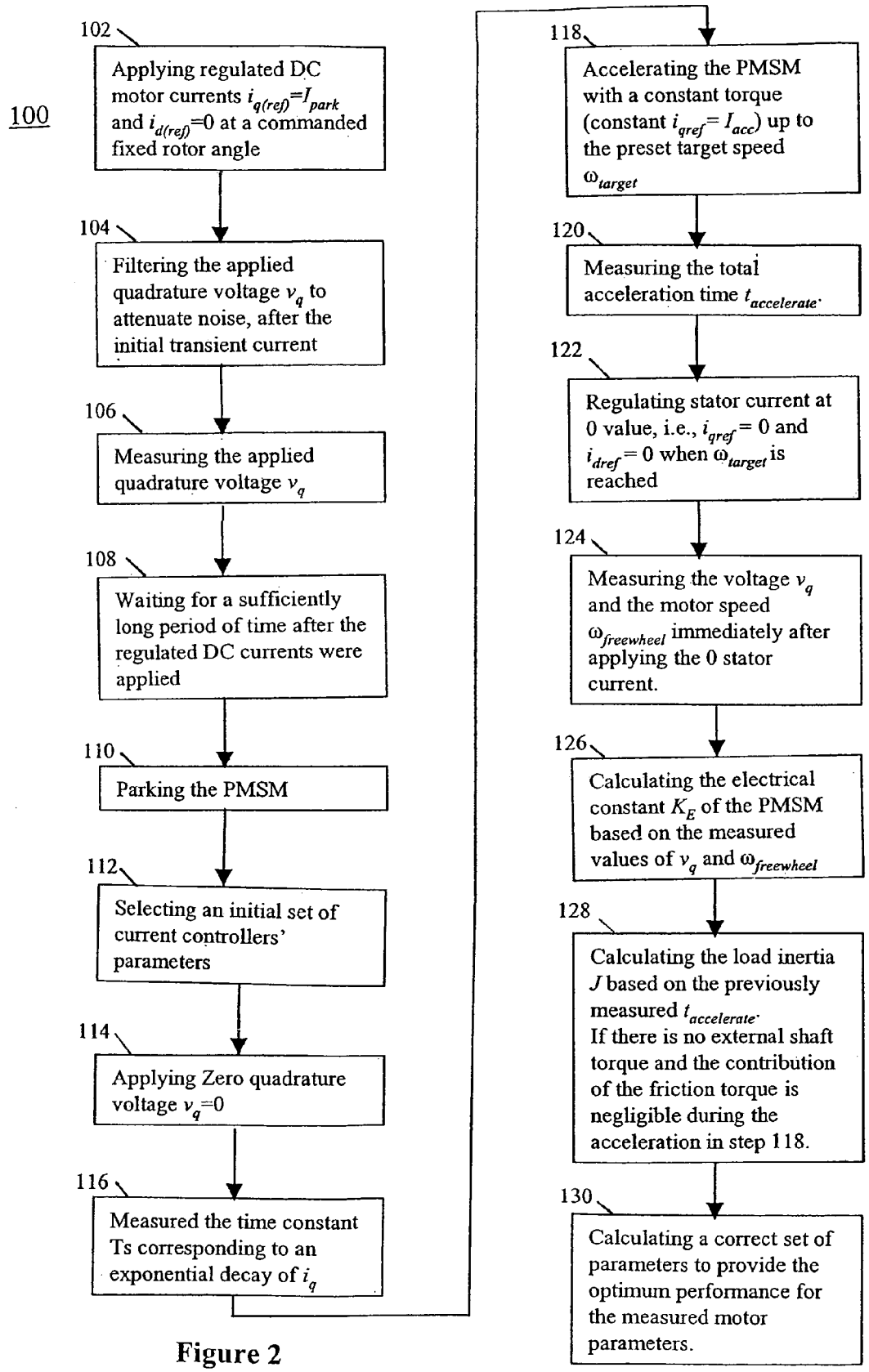
FIG. 2 is a flowchart of a procedure followed by the PMSM controller of the present invention in selecting motor parameters.

In the preferred embodiment of the present invention, it is assumed that the saliency of the Permanent Magnet Synchronous Motor (PMSM) is negligible, i.e., $L_d=L_q=L$. A procedure 100 for measurement of the motor parameters is shown in FIG. 2. As shown, in step 102 regulated DC motor currents $i_{q(ref)}=I_{park}$ and $i_{d(ref)}=0$ (see FIG. 1) are applied at a commanded fixed rotor angle. The applied quadrature voltage $v_q$ is then filtered in step 104, to attenuate noise, and measured in step 106 after the initial transient has passed.

In step 110, the PMSM is parked still after the regulated DC currents are applied for a sufficiently long period of time (step 108). The voltage $v_q$, which is applied across the windings, is then proportional to the stator resistance and to the applied current $I_{park}$. Therefore the stator resistance R can be calculated as $R=V_q/I_{park}$ based on the measured value of $v_q$.

In step 112, an initial set of current controllers' parameters is selected in such a way as to provide stable operation during the above-described procedure throughout an anticipated range of motor parameters. Alternatively, if a range of motor parameters is not known, a small DC voltage $V_{park}$ should be applied across two PMSM windings and the produced DC current $I_{park}$ should be recorded after averaging. The stator resistance can then be calculated as $R=k \cdot (V_{park}/I_{park})$.

In step 114, Zero quadrature voltage $v_q=0$ is applied and then, in step 116 the time constant Ts corresponding to an exponential decay of $i_q$ is measured. $T_s$ is dependent on R and L, therefore L can be calculated based on the known $T_s$ as $T_s \cdot R = L$.

In step 118, the PMSM is accelerated with a constant torque (constant $i_{q(ref)}=I_{acc}$) up to the preset target speed $\omega_{target}$ and the total acceleration time $t_{accelerate}$ is then measured in step 120. When $\omega_{target}$ is reached, the stator current is regulated at 0 value, i.e., $i_{q(ref)}=0$ and $i_{d(ref)}=0$ in step 122. In step 124, the voltage $v_q$ and motor speeds $\omega_{freewheel}$ are measured immediately after applying the 0 stator current. When stator current is regulated at 0, the applied $v_q$ is equal to the Electro Motive Force (EMF). Therefore, the electrical constant $K_E$ of the PMSM can be calculated in step 126 based on the measured values of $v_q$ and $\omega_{freewheel}$ as $$k_E = \frac{V_q}{\omega_{freewheel}}.$$

$k_E$ is equal to $(p \cdot \lambda)$ according to a model of the PMSM provided in accordance with above presented Equations 1 to 5.

If it is assumed that there is no external shaft torque and that the contribution of the friction torque is negligible during the acceleration in step 118, then the load inertia J is calculated in step 128 based on the previously measured $t_{accelerate}$ as $$J = 1.5 \cdot p \cdot \lambda \cdot I_{acc} \cdot \frac{t_{accelerate}}{\omega_{target}}.$$

A correct set of parameters can be calculated by the controller 20 in step 130 to provide the optimum performance for the measured motor parameters. The motor can then be restarted in a regulated speed mode with a forward catch spin. The friction coefficient F can be estimated, e.g., once a constant motor speed $\omega_{steady}$ corresponding to current $i_q = I_{steady}$ is reached in step 118, F can be calculated as $$F = 1.5 \cdot p \cdot \lambda \cdot I_{steady} \cdot \frac{1}{\omega_{steady}}.$$

Based on the calculated F, the calculation of J, given as $$J = 1.5 \cdot p \cdot \lambda \cdot I_{acc} \cdot \frac{t_{accelerate}}{\omega_{target}}$$

can be corrected by a factor of $$-\frac{F}{\omega_{target} t_{accelerate}} \int \omega_r dt$$

provided that $$\int_{t_{accelerate}} \omega_r dt$$

is recorded during the acceleration in step 118.

Existence of dead time and finite rise/fall time of the transistors in the power inverter stage introduces a difference between commanded and applied voltages and currents. To ensure correct measurement of motor parameters, these times need to be known and compensated for in the above calculations.

The above described method can be implemented in a digital processor 100 executing a computer program, as shown in FIG. 1. The processor is provided with the various inputs and provides outputs to control the motor during the operation of the described method. It receives inputs as described above to operate the motor to determine the motor parameters.

The following is an example of the above procedure. To distinguish between different 8-Pole PMSMs, e.g., a GM-300 PMSM having 0.25 Ohm current shunt and other PMSMs having 0.5 Ohm current shunt. The DC bus supply voltage is measured to distinguish between groups of PMSMs having rated voltage of 100V and 200V.

A parking current $I_{park}$ of 0.2A is applied (step 102) and the applied voltage $V_g^*$ is measured after the initial transient current has passed (step 106) after a low pass filtering is used to eliminate noise(step 104). For 100V PMSMs, parameters are initially tuned for AM50-37CV PMSM, while for 200V PMSMs, parameters are initially tuned for GM300 PMSMs.

When the PMSM is parked still at a desired angle of 0 degrees with parking current of 0.2A (step 110), the voltage drop across the two excited windings is resistive and dependent only on the motor resistance $R_s$; therefore $R_s$ can be calculated based on the applied value of $V_q^*$ as $$R_s = k \frac{V_q}{0.2A}.$$

Based on the calculated $R_s$, a distinction can be made between all the motors except when $R_s$ for a 200V motor is in 6 to 13 Ohms range. In this ambiguous case the motor can be identified as any of GM300, PM100-81FW or PM100-71FW.

The zero voltage (step 114) is applied and the time constant $T_s$ corresponding to the exponential decay of $i_q$ (step 116) is measured. $T_s$ is dependent on $R_s$ and $L_s$; therefore $L_s$ can be calculated based on the known $T_s$ as $$T_s = \frac{L_s}{R_s}.$$

The motor is accelerated with the constant torque ($I_q^*$ current of 0.2A) up to the target speed of a third of the rated speed (step 118). In the ambiguous case discussed above, the parameters are tuned for GM300 motor and the motor is accelerated up to the target speed of GM300 motor, 300 rpm. The total acceleration time $t_{accelerate}$ is then measured (step 120). When the target speed is reached, regulated stator current $I_s=0$ is applied (step 122). The voltage $V_q^*$ and motor speed $\omega$ are measured immediately after applying the regulated current $I_s=0$ (step 124).

When the regulated current $I_s=0$ is applied, the applied $V_q^*$ is equal to the EMF and therefore $k_E$ parameter of the motor can be calculated based on the measured $V_q^*$ and $\omega$ as $$k_E = \frac{V_q}{\omega}$$

(step 126). When both $k_E$ and $R_s$ are known, the ambiguous motor case can be resolved as well and the motor type identified with certainty. Based on the motor type, one of the 9 prestored sets of controller parameters can then be selected.

Load inertia J is calculated based on the previously measured $t_{accelerate}$ as $$J = k_T \cdot 0.2A \frac{t_{accelerate}}{\text{target\_speed}},$$

(step 128), where $k_T$ is known as a data sheet parameter for a particular motor type. A correct set of parameters can be selected for the recognized motor type and the measured inertia and the motor can then be re-started with a forward catch spin (step 130).

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A method of determining a plurality of parameters of a Permanent Magnet Synchronous Motor (PMSM) by a motor controller to differentiate between a plurality of PMSMs, the method comprising the steps of:
   applying regulated DC motor currents at a commanded fixed rotor angle;
   measuring a quadrature voltage $v_q$ after an initial transient has elapsed, the quadrature voltage being applied across the PMSM windings;
   parking the PMSM at standstill, whereby the quadrature voltage is proportional to a stator resistance and to the applied park current $I_{park}$;
   selecting an initial set of controller parameters;
   applying the quadrature voltage equal to zero;
   measuring a time constant $T_s$ corresponding to an exponential decay of a quadrature current $i_q$;
   accelerating the PMSM with a constant torque up to a preset target speed;
   measuring a total acceleration time $t_{accelerate}$ until the preset target speed $\omega_{target}$ is reached;
   regulating a stator current at 0 value, whereby the stator current is at 0 value when currents $i_{q(ref)}$ and $i_{d(ref)}$ are both at zero value;
   measuring the quadrature voltage and a freewheeling motor speed $\omega_{freewheel}$ immediately after applying the 0 stator current;
   calculating an electrical constant $K_E$ of the PMSM based on the measured values of the applied quadrature voltage and the freewheeling motor speed;
   calculating a load inertia J based on the previously measured total acceleration time; and
   calculating a set of parameters for the controller based on the determined motor parameters.

2. The method of claim 1, wherein the saliency of the PMSM is negligible and q and d axis inductances are equal to a PMSM inductance L and the regulated DC motor currents $i_{q(ref)} = I_{park}$ and $i_{d(ref)}$ are equal to 0.

3. The method of claim 1, wherein when stator current is regulated at 0, the applied quadrature voltage is equal to the Electro Motive Force (EMF).

4. The method of claim 3, further comprising a step of calculating an electrical constant $K_E$ of the PMSM based on the measured values of the quadrature voltage and free motor speed as $$k_E = \frac{V_q}{\omega_{freewheel}}.$$

5. The method of claim 4, wherein the electrical constant of the PMSM is equal to $(p \cdot \lambda)$, where $\lambda$ is an amplitude of a flux induced by the permanent magnets of the rotor in stator phases and p is a number of pole pairs.

6. The method of claim 5, wherein the step of calculating of the load inertia is based on the measured total acceleration time as $$J = 1.5 \cdot p \cdot \lambda \cdot I_{acc} \cdot \frac{t_{accelerate}}{\omega_{target}}.$$

7. The method of claim 1, further comprising a step of filtering the applied quadrature voltage to attenuate noise.

8. The method of claim 1, further comprising a step of waiting for a period of time after the regulated DC currents and applied before parking the PMSM.

9. The method of claim 1, wherein the stator resistance R during the parking step is calculated as $R = v_q/I_{park}$ based on the measured value of the quadrature voltage.

10. The method of claim 9, the PMSM inductance is calculated based on the known time constant as $T_s \cdot R = L$ where R is the stator resistance.

11. The method of claim 1, further comprising a step of estimating a friction coefficient F once a constant motor speed $\omega_{steady}$ corresponding to a steady current $i_q = I_{steady}$ is reached in the accelerating step.

12. The method of claim 11, wherein the friction coefficient is calculated as $$F = 1.5 \cdot p \cdot \lambda \cdot I_{steady} \cdot \frac{1}{\omega_{steady}}.$$

13. The method of claim 11, further comprising a step of correcting the calculation of the friction coefficient given as $$J = 1.5 \cdot p \cdot \lambda \cdot I_{acc} \cdot \frac{t_{accelerate}}{\omega_{target}}$$

by a factor of $$-\frac{F}{\omega_{target} t_{accelerate}} \int \omega_r dt.$$

14. A method of measuring a plurality of parameters of a Permanent Magnet Synchronous Motor (PMSM) by a motor controller to differentiate between a plurality of PMSMs, the method comprising the steps of:
   performing a first stage by
      applying regulated DC motor currents at a commanded fixed rotor angle, parking the PMSM at standstill, whereby a quadrature voltage applied across the PMSM windings is proportional to a stator resistance and to an applied park current, and
      selecting an initial set of controller parameters;
   performing a second stage by applying the quadrature voltage equal to zero,
accelerating the PMSM with a constant torque up to a preset target speed in accordance with a time constant corresponding to an exponential decay of a quadrature current, and
regulating a stator current at 0 value using a total acceleration time to the preset target speed, which the stator current is at 0 value when regulated DC motor currents are at zero value; and
performing a third stage by calculating
an electrical constant of the PMSM based on the values of the applied quadrature voltage and a free motor speed immediately after applying the 0 stator current,
a load inertia based on the previously measured total acceleration time, and
a set of parameters for the controller based on the determined motor parameters.

15. A controller for performing a Pulse Width Modulation (PWM) drive of a Permanent Magnet Synchronous Motor (PMSM) and for determining PMSM parameters to differentiate between a plurality of PMSMs, the controller comprising:
an outer speed loop for setting the desired speed of the PMSM;
a first inner current loop for regulating a quadrature component $i_q$ of the motor current;
a second inner current loop for regulating a direct component $i_d$ of the motor current, the motor current $i_d$ being the equivalent motor stator current projected onto a d-axis aligned with a rotor field, and the motor current $i_q$ being the equivalent motor stator current projected on a q-axis, which is perpendicular to the rotor field; and
a speed observer circuit having an input of voltages $v_\alpha$ and $v_\beta$ and currents $i_\alpha$ and $i_\beta$ and outputting an angular position of a rotor $\theta_r$ and an observed rotor speed $\omega_{obs}$,
wherein each of the loops includes a compensator, whose parameters can be adjusted based on measured motor parameters, further comprising a processor for measuring the motor parameters that implements the steps of
determining a plurality of parameters of a Permanent Magnet Synchronous Motor (PMSM) by a motor controller to differentiate between a plurality of PMSMs, the method comprising the steps of:
applying regulated DC motor currents at a commanded fixed rotor angle;
measuring a quadrature voltage $v_q$ after an initial transient has elapsed, the quadrature voltage being applied across the PMSM windings;
parking the PMSM at standstill, whereby the quadrature voltage is proportional to a stator resistance and to the applied park current $I_{park}$;
selecting an initial set of controller parameters;
applying the quadrature voltage equal to zero;
measuring a time constant $T_s$ corresponding to an exponential decay of a quadrature current $i_q$;
accelerating the PMSM with a constant torque up to a preset target speed;
measuring a total acceleration time $t_{accelerate}$ until the preset target speed $\omega_{target}$ is reached;
regulating a stator current at 0 value, whereby the stator current is at 0 value when currents $i_{q(ref)}$ and $i_{d(ref)}$ are both at zero value;
measuring the quadrature voltage and a freewheeling motor speed $\omega_{freewheel}$ immediately after applying the 0 stator current;
calculating an electrical constant $K_E$ of the PMSM based on the measured values of the applied quadrature voltage and the freewheeling motor speed;
calculating a load inertia J based on the previously measured total acceleration time; and
calculating a set of parameters for the controller based on the determined motor parameters.

16. The controller of claim 15, wherein the controller operates on the Field Oriented Control (FOC) principle to regulate a speed of the PMSM.

17. The controller of claim 15, wherein the inner current loops determine quadrature component $i_q$ of the motor current and the direct component $i_d$ of the motor current by
(a) receiving gate pulse signals from each switch and the DC bus voltage supply current,
(b) determining current values $i_a$, $i_b$ and $i_c$ of PMSM windings,
(c) performing a Clarke transformation $$\begin{bmatrix} i_\alpha \\ i_\beta \end{bmatrix} = \begin{bmatrix} 1 & 0 & 0 \\ 0 & \frac{1}{\sqrt{3}} & -\frac{1}{\sqrt{3}} \end{bmatrix} \begin{bmatrix} i_A \\ i_B \\ i_C \end{bmatrix}$$

on the determined current values to determine current values $i_\alpha$ and $i_\beta$,
(d) performing a Park transformation $$\begin{bmatrix} i_d \\ i_q \end{bmatrix} = \begin{bmatrix} \cos(\theta_r) & \sin(\theta_r) \\ -\sin(\theta_r) & \cos(\theta_r) \end{bmatrix} \begin{bmatrix} i_\alpha \\ i_\beta \end{bmatrix}$$

on the current values $i_\alpha$ and $i_\beta$, to determine current values $i_q$ and $i_d$,
(e) converting the current values $i_q$ and $i_d$ into corresponding voltage values $v_q$ and $v_d$,
(f) performing a reverse Park transformation $$\begin{bmatrix} v_\alpha \\ v_\beta \end{bmatrix} = \begin{bmatrix} \cos(\theta_r) & -\sin(\theta_r) \\ \sin(\theta_r) & \cos(\theta_r) \end{bmatrix} \begin{bmatrix} v_d \\ v_q \end{bmatrix}$$

on the voltage values $v_q$ and $v_d$, to determine voltage values $v_\alpha$ and $v_\beta$, and
(g) performing the reverse Clarke transformation $$\begin{bmatrix} v_A \\ v_B \\ v_C \end{bmatrix} = \begin{bmatrix} 1 & 0 \\ -0.5 & \frac{\sqrt{3}}{2} \\ -0.5 & -\frac{\sqrt{3}}{2} \end{bmatrix} \begin{bmatrix} v_\alpha \\ v_\beta \end{bmatrix}$$

on the voltage values $v_\alpha$ and $v_\beta$, to determine voltages $V_a$, $V_b$, and $V_c$ required to drive the PMSM at the desired speed sets by the outer control loop.

* * * * *